(No Model.) 2 Sheets—Sheet 1.
R. J. HARRISON.
SEED PLANTER AND CULTIVATOR.
No. 276,034. Patented Apr. 17, 1883.
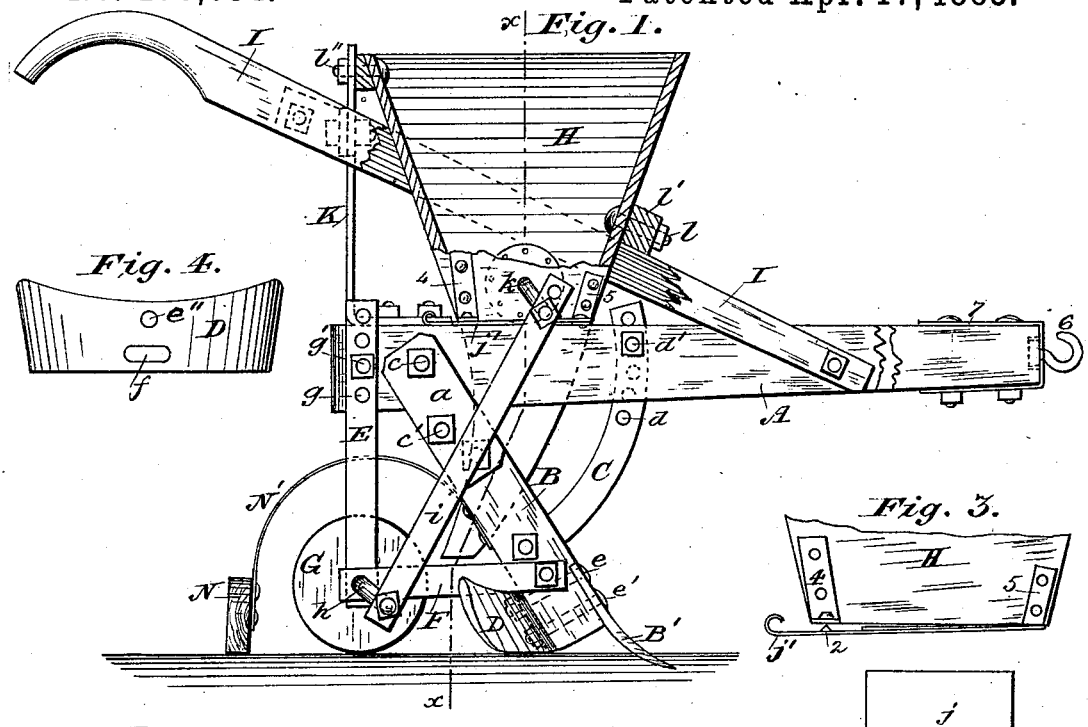
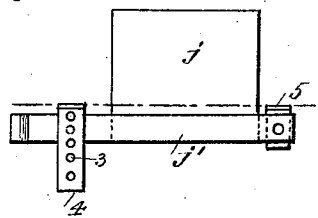
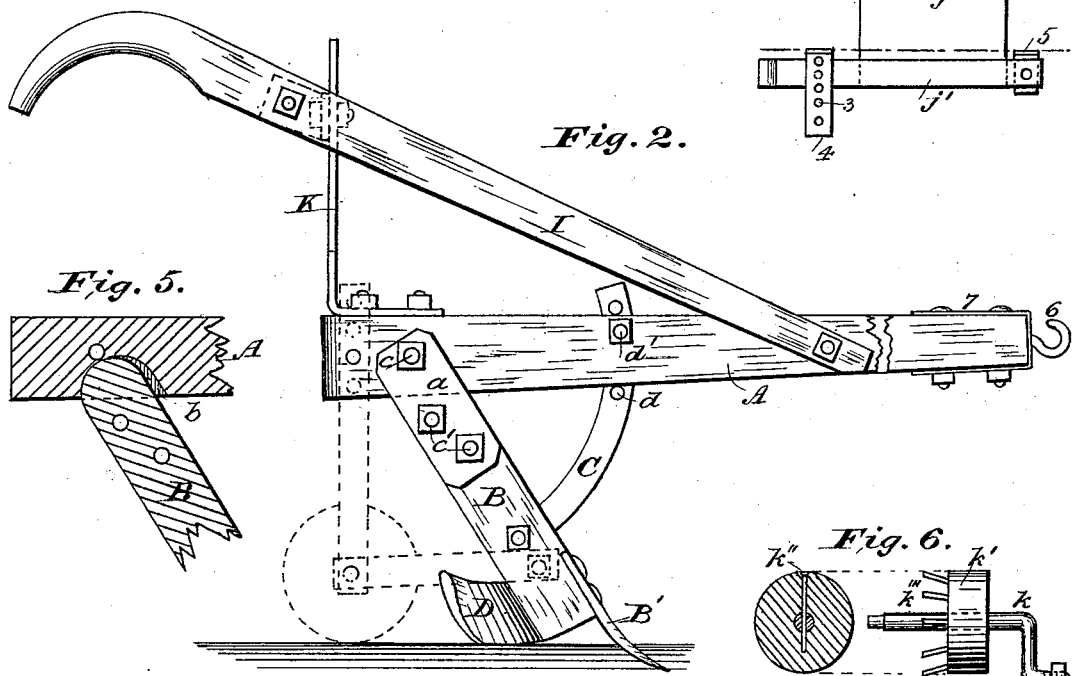
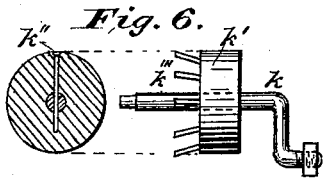
Witnesses:
John Monk
L. F. Keleher
Inventor:
Robert J. Harrison,
By T. C. Brecht
Attorney.
N. PETERS. Photo-Lithographer, Washington, D. C.

(No Model.) 2 Sheets—Sheet 2.
R. J. HARRISON.
SEED PLANTER AND CULTIVATOR.

No. 276,034. Patented Apr. 17, 1883.

Witnesses:
John Monk
S. F. Keleher.

Inventor
Robert J. Harrison,
By T. C. Brecht
Attorney.

UNITED STATES PATENT OFFICE.

ROBERT J. HARRISON, OF CARY, NORTH CAROLINA.

SEED-PLANTER AND CULTIVATOR.

SPECIFICATION forming part of Letters Patent No. 276,034, dated April 17, 1883.

Application filed September 7, 1882. (No model.)

*To all whom it may concern:*

Be it known that I, ROBERT J. HARRISON, a citizen of the United States, residing at Cary, in the county of Wake and State of North Carolina, have invented certain new and useful Improvements in Seed-Planters and Cultivators; and I do hereby declare the following to be a full, clear, and exact description of the invention, such as will enable others skilled in the art to which it appertains to make and use the same.

My invention relates to improvements in interchangeable seeders and cultivators; and the object of my invention is to improve the construction of such implements, so as to make their operation reliable, effective, and simple, that they are not liable to get out of order, and can be furnished at a moderate cost.

The invention consists in the construction and arrangement of the parts, as will be more fully described hereinafter, and more specifically pointed out in the claims, reference being had to the accompanying drawings and the letters of reference marked thereon.

Like letters refer to like parts in the figures of the accompanying drawings, in which—

Figure 12:
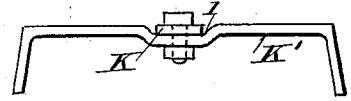
Figure 8:
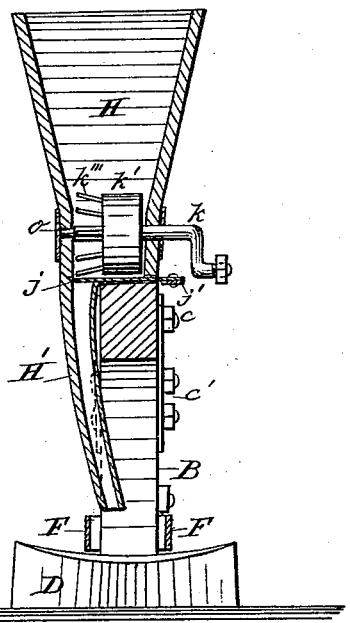
Figure 9:
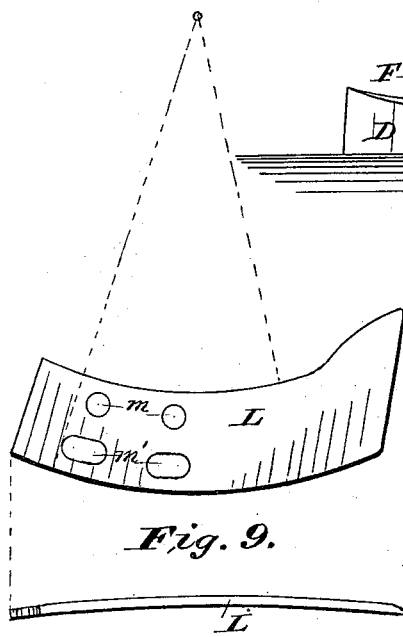
Figure 10:
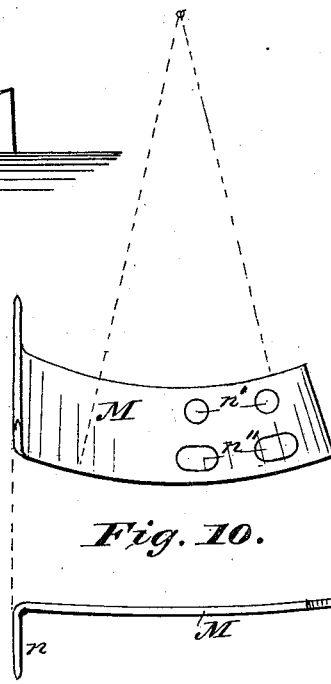
Figure 11:
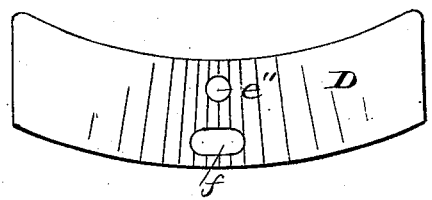

Figure 1 is a side elevation, partly in section, of a seeder. Fig. 2 is a side elevation of the same arranged as a cultivator. Fig. 3 are detail views of the hopper, slide, and spring-holder. Fig. 4 is a detail view of the adjustable scraper. Fig. 5 is a sectional detail view of the beam and plow-beam joint. Fig. 6 are detail views of the hopper-wheel. Fig. 7 are detail views of the caster-wheel. Fig. 8 is a vertical section on line $x\ x$ of Fig. 1. Figs. 9, 10, and 11 are views representing the form of the scrapers, with the adjusting-holes. Fig. 12 is a plan view of a brace for holding the upper end of the standard.

In the drawings, A is the beam, to which the share or plow-beam B, having the share or plow B' secured to it, is attached in the following manner: The upper end or tenon is rounded (as plainly seen in Fig. 5) and can be moved in recess $b$, so as to adjust it in it to a greater or less angle. It is secured to the beam A by two metal plates, $a\ a$, through which a bolt, $c$, passes, upon which it is pivoted in said beam A, and two bolts, $c'$, which hold it firmly in position. To the forward side of the share-beam is secured a sector, C, having a series of holes, $d$, or a slot in it, and passing through the beam A, in which it can be adjusted and held by a bolt, $d'$. To the lower end of beam B, and at its rear side, is attached a sweep, D, by means of a pivot-bolt, $e$, and secured by a bolt, $e'$, which passes through a slot, $f$, so that it can be readily adjusted more or less to one or the other side, and the points elevated or lowered thereby.

The standards E, provided with holes $g$ or a slot, are pivoted to the rear end of the beam A, and can be adjusted by a bolt, $g'$, to the desired height. To the lower end of these standards are secured two braces, F, one on each side, while the opposite ends thereof are secured to the beam B. In the lower end of the standards E is journaled a caster or guide wheel, G, by which the depth of the cut is regulated. The shaft $h$ of this wheel is made of a plain piece of iron, preferably of uniform size, and held in place by a pin, $h'$, which passes through it. It may be extended entirely through the wheel and riveted on both sides, as shown by dotted lines in Fig. 7. A crank is made on the end of this shaft, to which a connecting rod or link, $i$, is attached, and extends to the crank on a shaft, $k$, inserted through the sides of a hopper, H, and secured in a feed-wheel, $k'$, by a pin, $k''$, as shown in Fig. 6. The shaft $k$ is reduced at one side, as shown at $o$, Fig. 8, to form a shoulder and prevent the teeth of the feed-wheel coming in contact with the side of the hopper, while the wheel itself keeps it from the opposite side of said hopper. The wheel $k'$ is provided with a series of diverging teeth or fingers, $k'''$, by which the material is agitated and prevented from clogging or banking on the sides of the hopper. Motion is imparted to the wheel $k'$ by means of the link $i$ and the guide-wheel G.

The hopper H is secured in place by bolts $l$, passing through a cross-bar, $l'$, secured to the pivoted handle I, and by bolts $l''$, passing through a standard, K, at the rear end, secured to the beam A. Said standard is provided with a series of holes, or a slot, by which the handles can be adjusted to different heights. The upper end of this standard is held from lateral movement in a depression, 1, formed or swaged in a cross-bar, K', which is secured to the handle. The hopper is provided with a curved spout, H', which extends inward, so as to deliver the material (whatever it may be) in the center, and said material is protected in dropping by the braces F against the wind. At the upper end of the spout is arranged a slide or gate, j, and is adjusted, so as to give more or less opening for the material, by a spring bar or lever, j'. This lever has a small teat or catch, 2, on it, which engages with the perforations 3 in a catch, 4, secured to the side of the hopper, while its opposite end is pivoted to a piece, 5, also secured to the hopper. In the forward end of the beam A is arranged a swiveled hook, 6, held in place by the strap 7, secured to said beam, and serves to accommodate the draft-animals, as well as for their easy attachment to the seeder or cultivator.

If desired, the half-sweep L, which can be right or left, may be substituted for the whole sweep D, and it can be lengthened or shortened sidewise by attaching it to the beam B through the holes m and slots m', and the point elevated or lowered thereby. In some instances it is desired to substitute a scraper, M, having a bent point, n, to prevent the earth from falling on the small plants in the first operation of cultivating. It is also provided with holes n' and slots n'', to adjust it to the different widths, as desired, and elevate the point. In using the apparatus for a cultivator the hopper and spout are removed, and in some instances the standards, braces, and caster-wheel are also taken off, although these may be used, if desired, as shown by dotted lines in Fig. 2.

A spring-cover, N, is attached to the lower part of the beam B by a curved spring, N', so as to prevent any obstruction in moving or tilting the plow, as well as imparting to it greater elasticity and more perfect freedom to avoid obstructions. The sweep D may be also removed when using the apparatus as a planter or seeder. The object of raising the ends of the sweep is to prevent the cutting or injuring of the roots of the plants being cultivated, and for this reason it is necessary that one side will cut deeper in the middle of the row. Instead of the three bolts, there may be employed but two bolts, and suitable lugs may be arranged on the plates to engage with the beam.

Having thus described my invention, what I claim, and desire to secure by Letters Patent, is—

1. In a seed-planter, the laterally-adjustable sweep D, provided with a hole, e, and a slot, f, and said sweep curved, as shown, and attached to the plow-beam B, so as to be adjusted or elevated more or less to one or the other side, substantially as set forth.

2. In the seed-planter or cultivator herein described, the beam A, having recess b, and the plow-beam B, provided with rounded tongue, held in place by the plates a and bolts c c' c', in combination with the sweep D, curved, as shown, and adjusted in a lateral direction by a bolt, e, and hole e'', and slot f and bolt e', arranged substantially as specified.

3. In a seed-planter, the combination of the adjustable plow-beam B with the half-sweep L, provided with two holes, m, and two slots, m', to adjust said half-sweep to different elevations, as well as laterally, substantially as set forth.

4. In a seed-planter, the scraper M, provided with two holes, n', and two slots, n'', in combination with the adjustable plow-standard B, constructed and arranged as shown and specified.

5. The seed-planter herein described, consisting of a beam, A, pivoted handles I, standard K, hopper H, plow-beam B B', sweep D, caster-wheel G, standards E, braces F, sector C, and spring-coverer, all constructed and arranged substantially as specified.

In testimony whereof I affix my signature in presence of two witnesses.

R. J. HARRISON.

Witnesses:
LLOYD F. KELEHER,
JOHN MONK.